(12) United States Patent
Prand-Stritzko (10) Patent No.: US 8,450,900 B2
(45) Date of Patent: May 28, 2013

(54) METHOD FOR THE MECHANICAL WINDING OF A COIL

(75) Inventor: Ernst Prand-Stritzko, Langau (AT)

(73) Assignee: Egston System Electronics Eggenburg GmbH, Eggenburg (AT)

( * ) Notice: Subject to any disclaimer, the term of this patent is extended or adjusted under 35 U.S.C. 154(b) by 583 days.

(21) Appl. No.: 12/531,405

(22) PCT Filed: Feb. 28, 2008

(86) PCT No.: PCT/AT2008/000066
§ 371 (c)(1),
(2), (4) Date: Mar. 2, 2010

(87) PCT Pub. No.: WO2008/113086
PCT Pub. Date: Sep. 25, 2008

(65) Prior Publication Data
US 2010/0164320 A1 Jul. 1, 2010

(30) Foreign Application Priority Data
Mar. 16, 2007 (AT) .................................. A 421/2007

(51) Int. Cl.
*H02K 3/00* (2006.01)
(52) U.S. Cl.
CPC ....................................... *H02K 3/00* (2013.01)
USPC ......................................................... 310/208
(58) Field of Classification Search
CPC ....................................................... H02K 3/00
USPC ................................................. 310/201–208
See application file for complete search history.

(56) References Cited

U.S. PATENT DOCUMENTS

| 4,794,361 A * | 12/1988 | Young ........................... 336/189 |
| 5,986,377 A * | 11/1999 | Yamada et al. ......... 310/216.013 |
| 8,058,766 B2 * | 11/2011 | Hoshino et al. ............... 310/208 |
| 2003/0209627 A1 | 11/2003 | Kawano et al. |
| 2003/0214197 A1 | 11/2003 | De Luca et al. |
| 2004/0263015 A1 | 12/2004 | Okada et al. |
| 2006/0022549 A1 | 2/2006 | Otsuji |
| 2006/0033395 A1 | 2/2006 | Izumi et al. |

FOREIGN PATENT DOCUMENTS

| DE | 31 24 264 A1 | 6/1982 |
| EP | 0 343 497 A | 11/1989 |
| EP | 0 920 107 A | 6/1999 |
| FR | 716496 A | 12/1931 |
| JP | 05090056 A | 4/1993 |
| JP | 2005020875 A | 1/2005 |
| JP | 2005327926 A | 11/2005 |
| WO | WO 95/12912 A | 5/1995 |

\* cited by examiner

*Primary Examiner* — Dang Le
(74) *Attorney, Agent, or Firm* — Henry M. Feiereisen LLC (57) ABSTRACT

A method for the mechanical winding of a coil having at least one wire is disclosed. The coil has a coil inner side and at least two winding layers, with one winding layer being formed by turns situated essentially parallel to the coil inner side, to increase the precision of the winding and to reduce the dimensional tolerances of the winding. At least during the winding of a first winding layer, a gap is formed at a predefinable position between a first turn and a second turn adjacent to the first turn, with the second turn being wound immediately following the first turn. The width of the gap at least regionally is at least one wire diameter, and the wire is guided into the gap after the winding of the second turn, and optionally after the winding of further turns, thereby forming at least one support turn.

9 Claims, 5 Drawing Sheets

METHOD FOR THE MECHANICAL WINDING OF A COIL

CROSS-REFERENCES TO RELATED APPLICATIONS

This application is the U.S. National Stage of International Application No. PCT/AT2008/000066, filed Feb. 28, 2008, which designated the United States and has been published as International Publication No. WO 2008/113086 and which claims the priority of Austrian Patent Application, Serial No. A 421/2007, filed Mar. 16, 2007, pursuant to 35 U.S.C. 119(a)-(d).

BACKGROUND OF THE INVENTION

The invention relates to a method for the mechanical winding of a coil having at least one wire, the coil comprising a coil inner side and at least two winding layers, one winding layer being formed by turns situated essentially parallel to the coil inner side.

Coils find numerous uses in electrical components, such as servomotors and electric motors. Above all the most recent developments in the field of transport, above all in the automobile sector, require ever higher performance electric motors with simultaneously restricted or ever smaller dimensions thereof. Therefore, attempts are being made to fill the predetermined volume in the servomotor or electric motor as completely as possible with the wire implementing the coil, in order to increase the power density and to implement higher and higher performance motors with dimensions which remain the same or ever smaller and lighter motors with performance which remains the same.

Because more volume is available in the area of the electric motor facing away from the central or rotor axis, because the circumference becomes larger, than in the area facing toward the central or rotor axis, so-called conical coils are therefore used for better exploitation of the volume available for the coil, which are implemented as wider in the outer area than in the rotor area of the electric motor.

Irregularities always occur during the winding on the conical coil external geometry of the coil, so that upon the mechanical winding of multiple coils, unequal coil external geometries and greater dimensional tolerances occur. If multiple coils are situated adjacent to one another in the electrical component and/or the electrical machine, these coils must be situated spaced apart from one another, in order to take the tolerances occurring during winding into consideration.

SUMMARY OF THE INVENTION

The object of the invention is therefore to disclose a method for the mechanical winding of a coil of the type cited at the beginning, using which the above-mentioned disadvantages may be avoided and using which coils may be wound cost effectively with higher precision and lower dimensional tolerances in a large piece count.

This is achieved according to the invention in that, at least during the winding of a first winding layer, at a predefinable position between a first turn and a second turn adjacent to the first turn, the second turn being wound immediately following the first turn, a gap is implemented, the width of the gap at least regionally being at least one wire diameter, and the wire being guided into the gap after the winding of the second turn, and optionally after the winding of further turns, at least one support turn being implemented.

It is advantageous that a location which is simple to produce mechanically for receiving the support turn is implemented by the gap. The gap represents a particularly advantageous possibility for implementing the receptacle for the support turn in the coil. Turns of a later winding layer are guided into the gap during the winding of the coil and form the support turn or the support turns in this way. The gap can be predetermined precisely in its location for this purpose. As the winding procedure progresses, the wire of a subsequently wound wire piece is situated in the gap and the wire piece situated in the gap in this way forms the support winding. Both the gap and also the support turn are producible in the position on the coil with high precision and reliable reproducibility. Furthermore, it is advantageous that the wire is supported on at least one end of the support turn against lateral slipping by the support turn and lateral slipping of the wire is avoided in this way. In this way, the wire is also situated precisely and reproducibly in the support turn and the turns connected directly to the support turn even in spite of the lateral forces occurring during winding. The coil can be adapted better to the volume available for the coil in the electrical component, whereby good space exploitation and thus an increase of the power density are achieved. As noted, the support turn and the wire jump are predefinable precisely in their location and a high quality of the dimensional tolerances is made possible.

In a refinement of the invention, it can be provided that at least one turn of a second winding layer is wound before or after the winding of the at least one support turn, the second winding layer being situated adjacent to the first winding layer and on the side of the first winding layer facing away from the coil inner side. The wire can thus be guided from a first winding layer into a second winding layer. Because the support turn prevents lateral slipping of the wire, the wire advance of a guide unit of the winding machine, which guides the wire during the winding, in particular a winding arm, can deviate in the area of the layer jump by a predetermined tolerance from the offset of the wire to be wound. The reproducible dimensional tolerances of the winding of the coil may be less than the positioning tolerances of the guide unit of the winding machine.

It can advantageously be provided that the second winding layer is delimited using the support turn. The second winding layer can thus be implemented over only a subarea of the coil surface, in particular the coil outer side, a step being able to be implemented. The support turn, which is supported relative to lateral slipping, can implement the layer position of this step with high precision and high reproducibility, whereby a high dimensional precision and low dimensional tolerances of the conical coil, in particular the geometry of the coil outer side, may be made possible.

According to a further embodiment of the invention, it can be provided that the length of the first winding layer is greater than the length of the second winding layer. The step can thus be implemented such that a conical coil outer side can be implemented, the slipping of the support turn being able to be prevented with particular reliability. Furthermore, at least the second winding layer can thus only be implemented over a subarea of the coil surface, in particular the coil outer side. The support turn, which is supported relative to lateral slipping, can implement the layer position of this step with high precision and high reproducibility, whereby lower dimensional tolerances of the conical coil, in particular the geometry of the coil outer side, may be made possible.

In this context, it can be provided in a further design of the invention that the turns of the second winding layer are wound after the winding of the support turn, and a guide for the first turn wound in the second winding layer is implemented at the insertion location of the wire into the gap. The support turn can thus be used for the guide for the first turn wound in the second winding layer. Through the precise layer positioning of the support turn, the first turn of the second winding layer can also be wound with higher precision of the layer of this turn. A step having high location precision is thus windable reproducibly, this first turn implementing this step being secured by the guide against slipping, in particular against slipping in the direction of the open end of the second winding layer. In this way, conical coils having low dimensional tolerances may be achieved, because of which adjacent coils may be situated with less intermediate space from one another or they may touch the adjacent coils. The volume available for the coils is used particularly well in this way and the power density is increased further. In particular, servomotors and electric motors having performance which remains the same and/or smaller dimensions and lower weight become possible and the dimensional tolerances and electrical properties of the coil are implemented with particularly low tolerances.

According to a further implementation of the invention, it can be provided that the support turn is spaced apart from the next wound turn by at least two, preferably at least three, in particular at least four wire diameters. In this way, the support turn can be implemented following the wire jump, which crosses multiple turns of a winding layer implemented below the wire jump and whereby the offset of the wire parallel to the coil axis in this wire jump can be multiple wire diameters. The implementation of a wire jump, i.e., an enlarged advance of the wire, is possible on at least one end of the support turn, the support turn supporting this wire jump and preventing slipping of the wire at the end of the wire jump. In this way, wire jumps are implemented over multiple wire diameters and over multiple winding layers with high precision, with low tolerances, and with high reproducibility in a large number of coils, even with mechanical winding, and complex coil geometries may be mechanically wound with high precision.

According to a further embodiment of the invention, it can be provided that the support turn is spaced apart from the previously wound turn by at least two, preferably at least three, in particular at least four wire diameters. The support turn can thus be implemented prior to the wire jump. This support turn, which is secured against lateral slipping, can thus fix the end of the wire jump facing toward the support turn in the layer. At least this end of the wire jump is thus secured with high location precision relative to slipping and this wire jump can be wound over many coils with constant location tolerance.

In a refinement of the invention, it can be provided that the coil is implemented having an orthocyclic winding. In an orthocyclic winding, the turns are wound in the first area along the coil circumference, in particular in a majority of the coil outer surface, so that they are guided parallel to the base surface and/or cover surface. The offset of the wire guided by the advance of the guide unit of the winding machine occurs in a second area along the coil circumference, the second area only making up a part of the coil circumference. The second area can also be implemented distributed in multiple parts, in particular two parts, over the coil circumference. This allows coils having a high order of the turns and coils in which a high order of the turns is ensured even in higher winding layers.

Advantageously, it can be provided that the support turn is at least regionally situated completely in the first winding layer. The support action of the support turn can thus be implemented particularly advantageously and with high reliability. The support action can also be ensured if high lateral forces occur, so that wire jumps may be wound with high reliability and reproducible layer and dimensional tolerance.

In an advantageous refinement of the invention, it can be provided that at least two support turns are situated in the gap. Gaps wider than one wire diameter may thus also be filled with support turns and coils comprising multiple wires may also be wound in this way. Each of the multiple wires, which are particularly wound simultaneously and in parallel using the guide unit of the winding machine, can be guided into the gap, so that a support turn can be implemented in each of the multiple wires.

Furthermore, the invention relates to a coil having a mechanical layer winding, in particular a mechanical layer precision winding.

Coils find numerous uses in electrical components, such as servomotors and electric motors. Attempts are being made to fill the predetermined volume in the servomotor or electric motor as completely as possible with the wire implementing the coil, in order to increase the power density and to implement ever higher performance motors with dimensions which remain the same or ever smaller and lighter motors with performance which remains the same.

It is a further object of the invention to disclose a coil of the above-mentioned type, a large number of essentially identical coils being able to be produced mechanically with high precision and low dimensional tolerances.

This is achieved according to the invention in that the coil is producible according to the method according to the invention.

It is advantageous that the location tolerances and the dimensional tolerances of the individual turns may be less than the manufacturing tolerances of the winding machine, i.e., the tolerances and/or positioning tolerances of the guide unit achievable during the winding.

Furthermore, the invention relates to a coil having a mechanical layer winding, in particular a mechanical layer precision winding, having at least one wire, the coil comprising a coil axis, a coil inner side, a base surface, a cover surface, and at least two winding layers, one winding layer being formed by turns situated essentially parallel to the coil inner side, the coil axes being situated parallel to the main magnetic field direction of the current-carrying coil, and the base surface and the cover surface each being essentially perpendicular to the coil axis.

Coils find numerous uses in electrical components, such as servomotors and electric motors, attempts being made to fill the predetermined volume in the servomotor or electric motor as completely as possible with the wire implementing the coil.

It is a further object of the invention to disclose a coil of the above-mentioned type, the space available for coils of an electrical component which comprises one of these coils being filled up as completely as possible with the wire implementing the coil.

This is achieved according to the invention in that at least one second winding layer is incompletely wound, and the end of the second winding layer spaced apart from the base surface and/or the cover surface is delimited by a support turn, the support turn being situated at least regionally in the first winding layer adjacent to the second winding layer in the direction of the coil inner side.

It is advantageous that the wire is supported on at least one end of the support turn by the support turn against lateral slipping and thus lateral slipping of the wire is prevented. The wire is thus situated precisely and reproducibly in the support turn and in the turns connected directly to the support turn even in spite of lateral forces occurring during the winding.

Because higher lateral forces are permissible during the winding procedure, mechanically wound wire jumps of higher precision are made possible, at least one wire jump being provided on at least one end of the support turn. Through the location fixing of the support turn, a more precise offset of the wire upon the wire jump, which is in the magnitude of multiple wire diameters, for example, three, four, five, or more, is implemented having higher mechanical reproducibility and the danger of slipping of the wire in the area of the wire jump does not occur. The coil can be adapted better for the volume available in the electrical component, whereby a good spatial exploitation and thus an increase of the power density are achieved.

In this context, further turns may at least regionally adjoin opposing sides of the support turn in the first winding layer. They can thus secure the support turn relative to slipping in parallel and in both directions of the coil axis, so that lateral forces may be absorbed by this support turn in parallel and in both directions of the coil axis.

The invention also relates to an electrical component, in particular an electric motor, having a coil configuration, in particular an annular coil configuration.

Electrical components have numerous uses in particular in servomotors and electric motors, attempts being made to fill up the predetermined volume in the electrical component as completely as possible with the wire implementing the coil and thus achieve a high degree of filling.

This is achieved according to the invention in that the electrical component comprises at least one coil according to the invention.

Complex coil geometries may thus also be mechanically wound with high precision. Through the small tolerances, adjacent coils in the electrical component may be situated with less spacing to one another and the power density of the electrical component, in particular the electric motor, is increased. In particular, servomotors and electric motors may be implemented having performance which remains the same and/or smaller dimensions and lower weight.

In this context, it can be provided that a coil outer surface of at least one of the coils has a step, the at least one step being formed by external turns of a lower winding layer and one external turn of an upper winding layer, a step free surface—viewed in a sectional plane containing the coil axis—is formed by the turns of the step and the outer tangents on the turns of the step, and a further one of the coils engages in one of the at least one step free surfaces. In this way, complex geometries of the electrical component may also be implemented by the individual coil configurations. In particular, a particularly small diameter of the annular coil configuration can be implemented, the intermediate spaces between the adjacent coils being able to be used better and the degree of filling of the coil configuration being able to be increased still further.

It can advantageously be provided that at least two adjacent coils each have a stepped coil outer surface, the steps of the coil outer surfaces of these coils facing toward one another being situated so that the spacing of the coil outer surfaces is essentially less than or equal to 1.3 times, preferably 1.2 times, in particular 1.1 times the wire diameter. In this way, particularly small empty volumes can also be implemented between the adjacent coils, so that the degree of filling of the coil configuration is increased further and the power density of the coil configuration can be elevated further.

BRIEF DESCRIPTION OF THE DRAWING

The invention is described in greater detail with reference to the appended drawings, in which exemplary embodiments are shown. In the figures.

DETAILED DESCRIPTION OF PREFERRED EMBODIMENTS

FIGS. 1 through 11 show embodiments of a coil 1 according to the invention, the coil 1 according to the invention being formed using a method for the mechanical winding of a coil 1 having at least one wire 4, the coil 1 comprising a coil inner side 14 and at least two winding layers 2, one winding layer 2 being formed by turns 5 situated essentially parallel to the coil inner side 14. To increase the precision of the winding and to reduce the dimensional tolerances of the winding, it is provided that during the winding of a first winding layer 21, at a predefinable location between a first turn 54 and a second turn 55, which is adjacent to the first turn 54, the second turn 55 being wound immediately following the first turn 54, a gap 6 is implemented, the width of the gap 6 at least regionally being at least one wire diameter, and the wire 4 being guided into the gap 6 after the winding of the second turn 5, and optionally after the winding of further turns 5, at least one support turn 51 being implemented.

It is advantageous that the wire 4 is supported in the support turn 51 and lateral slipping of the wire 4 is thus prevented. Due to the permissibility of higher lateral forces during the winding procedure, mechanically wound wire jumps 41 of greater precision are made possible. The wire jump 41 is provided on at least one end of the support turn 51. Through the location fixing of the support turn 51, a more precise offset 42 of the wire in the wire jump 41 is possible, which is in the magnitude of multiple wire diameters, for example, three, four, five, or more. The danger of slipping of the wire 4 in the area of the wire jump 41 does not occur. The coil 1 can be adapted better to the volume available for the coil 1 in the electrical component, whereby good spatial exploitation and thus an increase of the degree of filling and the power density are achieved.

As noted, the support turn 51 and the wire jump 41 can be predetermined precisely in location and a high quality of the dimensional tolerances is also achieved in the conical coil 1, because of which adjacent conical coils 1 may be situated with less intermediate space to one another. Using the precise predictability of the wire jumps 41, the stepped configuration of the winding layers 2 of adjacent conical coils 1 is adapted to one another, so that the adjacent coils 1 may touch one another. The volume available for the coils 1 is exploited particularly well in this way and the power density can in turn be increased.

This implementation of wire jumps 41 in precise locations can be important above all in coils 1 having only weakly pronounced cones, because particularly large wire jumps 41 may be necessary as a result of the flat angle of the cone. Because excessively high lateral forces occur during the winding at a jump location of this type, the secure guiding of the wire 4, which is stable to lateral forces, in the area of the jump location, above all the reproducibility of the guiding of the wire over many mechanically-wound coils 1, is particularly difficult without a support turn and the implementation of the support turn is therefore particularly advantageous.

The coil 1 can be wound on a coil carrier 7. The coil 1 comprises a wire 4 which has a conductor and an insulation layer, preferably lacquer insulation. The conductor can comprise metal, in particular copper, aluminum, silver, or an alloy of one of the above metals, and can be drawn, cast, or rolled. The cross section of the wire 4 can be implemented without lateral edges, in particular round or elliptical, or with lateral edges, in particular rectangular or square.

The coil 1 can be wound on a coil carrier 7, the coil carrier 7 being able to have guides for an innermost winding layer 2. The coil carrier 7 can support the precise configuration of the turns 2 of the innermost winding layer 31. The coil carrier 7 can have a structured surface in the form of ridges on the surface which is in direct contact with the coil inner side 14 for this purpose. The individual turns 2 of the innermost winding layer 2 may be guided in the serrations of the ridges during winding, i.e., during the winding procedure. In this way, the turns 2 may be situated with a predeterminable tolerance to one another and to the coil carrier 7 and a precision or high-precision mechanical layer winding is made possible. The carrier 2 can advantageously be implemented in multiple parts from multiple individual carriers spaced apart from one another.

Figure 1:
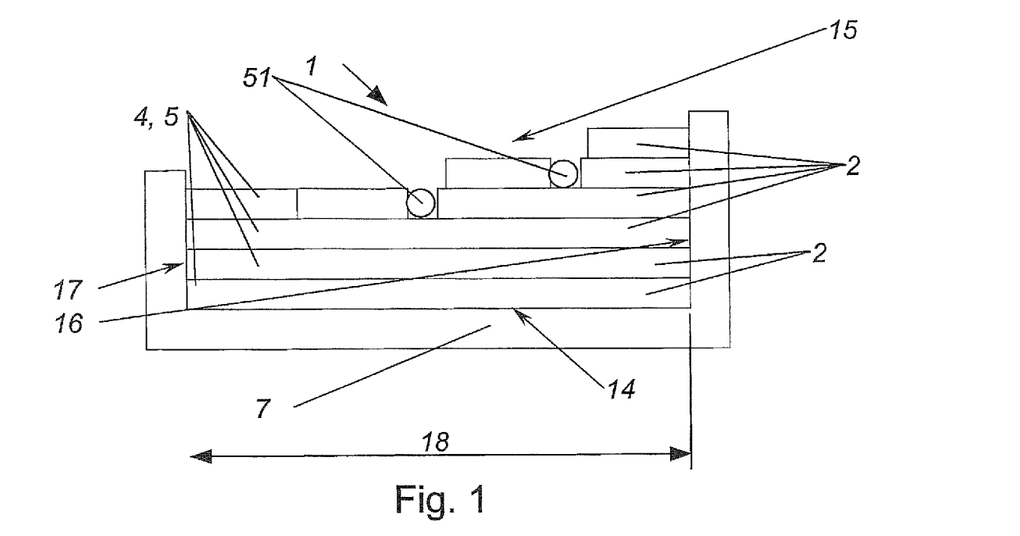
FIG. 1 shows one half of a coil of a first embodiment on a coil carrier having multiple winding layers and multiple winding layers in a schematic illustration in section.

FIG. 1 shows a first preferred embodiment of a coil 1 according to the invention. The coil 1 is wound on a coil carrier 14 and comprises four to six winding layers 2, which are wound one on top of another, four winding layers 2 being implemented on a cover surface 17 of the coil 1 and six winding layers 2 being implemented on a base surface 16 of the coil 1, which is opposite to the cover surface 17. The coil height 18 is implemented between the base surface 16 and the cover surface 17 of the coil 1. Five winding layers 2 are implemented in an area along the coil height 18 between the base surface 16 and the cover surface to 17 of the coil 1. A differing number of winding layers 2 can be implemented in this way viewed along the coil inner side 14—and thus along the coil height 18. A stepped coil outer side 15 is implemented by the differing number of the winding layers 2. Because of the stepped coil outer side 15 and the differing number of winding layers 2, the coil 1 can also be referred to as a conical coil 1. The transition from six winding layers 2 wound one above another to five winding layers 2 wound one above another and the transition from five winding layers 2 wound one above another to four winding layers 2 wound one above another is implemented in each case as a step 23 in the coil outer side 15. Two support turns 51 are implemented in the coil 1 according to the first embodiment. These two support turns 51 fill gaps 6 implemented during the winding.

FIG. 2 through FIG. 7 show a coil 1 of a first embodiment and illustrate the production process in that the winding layers 2 building up the coil 1 and the corresponding advance direction 31 of the particular winding layer 2 are shown in sequence. For this purpose, several essential work steps of a method for the mechanical winding of a coil 1 are shown, the coil 1 being wound from a wire 4, having a coil carrier 7, a coil height 18, a base surface 16, a cover surface 17, a coil inner side 14, multiple winding layers 2 wound in sequence, and a coil outer side 15 after completed winding, one winding layer 2 being formed by turns 5—not shown in this schematic illustration—situated essentially parallel to the coil inner side 14, one winding layer 2 comprising all turns 5 having the same advance direction 31 of a coherent piece of the wire 4.

Figure 2:
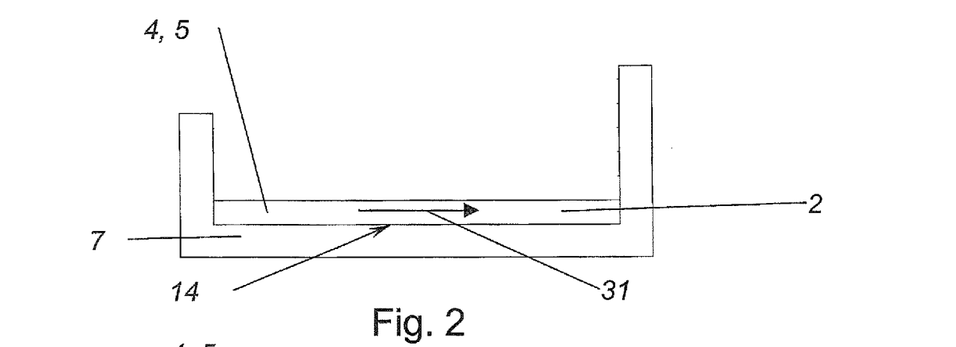
FIG. 2 shows an innermost winding layer of one half of a coil in a first embodiment and identification of the advance direction of the first winding layer in a schematic sectional illustration.

The first winding layer 2 and the advance direction 31 of the innermost winding layer 2 are particularly emphasized in FIG. 2. The innermost winding layer 2 is implemented on the face of the coil inner face 14 facing toward the coil carrier 7. The coil carrier 7 can also be implemented as a winding carrier in the winding machine. In this way, a coil carrier 7 does not remain on the coil 1 after the completed winding procedure and the coil 1 essentially only comprises the wire 4.

To implement the innermost winding layer 2, the wire 4 is inserted on the cover surface 17 of the coil 1, in the direction of the advance according to advance direction 31, the individual turns 5 of the innermost winding layer 2 are guided adjacent to one another until the innermost winding layer 2 on the base surface 16 of the coil 1 is wound to the end. The wire 4 is guided into the next winding layer 2, i.e., the second-innermost winding layer 2, in the area of the base surface 16 of the coil 1, and the advance direction 31 is changed. The advance direction specifies the advance direction of the guide unit of the wire 1, in particular the winding arm of the winding machine. The dimension of the advance is constant over the entire coil height 18.

Figure 3:
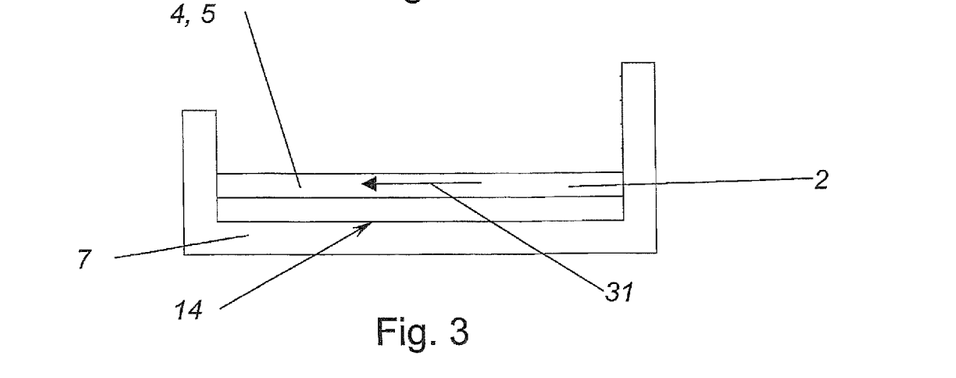
FIG. 3 shows two innermost winding layers of one half of a coil of a first embodiment and identification of the advance direction of the second winding layer in a schematic sectional illustration.

In contrast to FIG. 2, the second-innermost winding layer 2 is also shown in FIG. 3. The advance direction 31 is oriented from the base surface 16 to the cover surface 17 in this winding layer 2. The second-innermost winding layer 2 is wound from the base surface 16 to the cover surface 17. The dimension of the advance is constant over the entire coil height 18. The second-innermost winding layer 2 ends on the cover surface 17 of the coil 1 and the wire 4 implementing the turns 5 is guided into the next-higher winding layer 2, i.e., the third-innermost winding layer 2.

Figure 4:
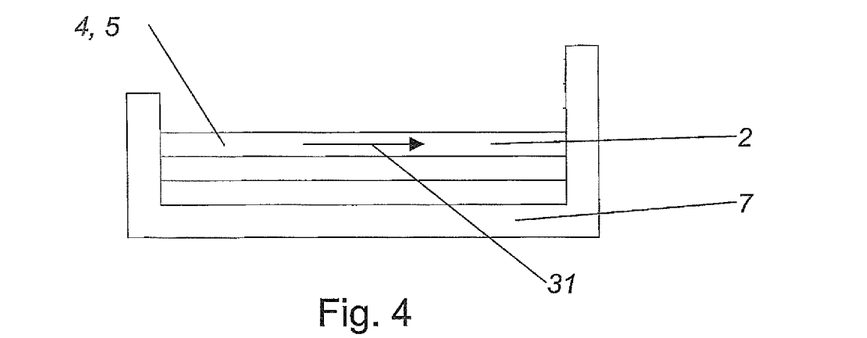
FIG. 4 shows three innermost winding layers of one half of a coil of a first embodiment and identification of the advance direction of the third winding layer in a schematic sectional illustration.

In contrast to FIG. 3, the third-innermost winding layer 2 is also shown in FIG. 4. After the third-innermost winding layer 2 is completely wound, the wire 4 is guided into the winding layer 2 lying above it, the fourth-innermost winding layer 2, at the base surface 16 of the coil 1, the advance direction 31 is changed, and the fourth-innermost winding layer 2 is wound.

Figure 5:
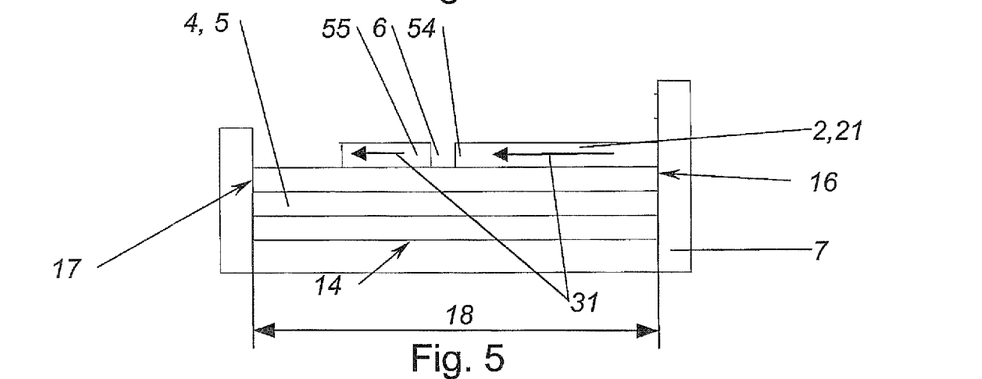
FIG. 5 shows four winding layers of one half of a coil of a first embodiment and identification of the advance direction of the fourth winding layer in a schematic sectional illustration.

In contrast to FIG. 4, the fourth-innermost winding layer 2 is also shown in FIG. 5. In the middle area of the coil height, i.e., approximately in the middle between base surface 16 and cover surface 17, a first turn 54 and a second turn 55 are wound in immediate succession. In this way the first turn 54 and the second turn 55 are implemented adjacent to one another, a gap 6 being implemented between these two turns 5, 54, 55, the width of this gap 6 being at least one wire diameter at least regionally along the coil circumference.

The gap 6 in the fourth-innermost winding layer 2 is implemented by an enlarged offset 42 of the wire 4 in the first turn 54. The offset 42 of the wire may be implemented as essentially one wire diameter greater than the offset 42 of the wire 4 in the majority of the turns 5 of the same winding layer 2. The subsequently wound second turn 55 is wound adjacent to and spaced apart from the first winding 54 through, the enlarged offset 42 of the wire 4 of the first turn 54. The offset 42 of the wire 4 of the second turn 55 in turn corresponds to the offset 42 of the wire 4 in the majority of the turns 5 of the same winding layer 2. The difference of the dimension of the offset 42 of the wire 4 of the first turn 54 and the offset 42 of the wire 4 in the majority of the turns of the same winding layer 2 determines the maximum width of the gap 6 implemented in this winding layer 2. The part of this winding layer 2 between gap 6 and cover surface 17 is implemented on the windings 5 wound following the second turn 55. The advance direction 31 is the same in all turns 5 of this winding layer 2 and is directed from the base surface 16 to the cover surface 17.

The fourth-innermost winding layer 2 shown in FIG. 5 does not extend—in contrast to the previously wound winding layers 2—over the entire coil height 18. After the first gap 6, several further turns 5 are wound, but the fourth winding layer 2 ends from the cover surface 17 of the coil 1, this spacing being greater than one wire diameter and a temporarily open end 24 of the fourth-innermost winding layer 2 of the coil 1 being implemented in this way.

Figure 6:
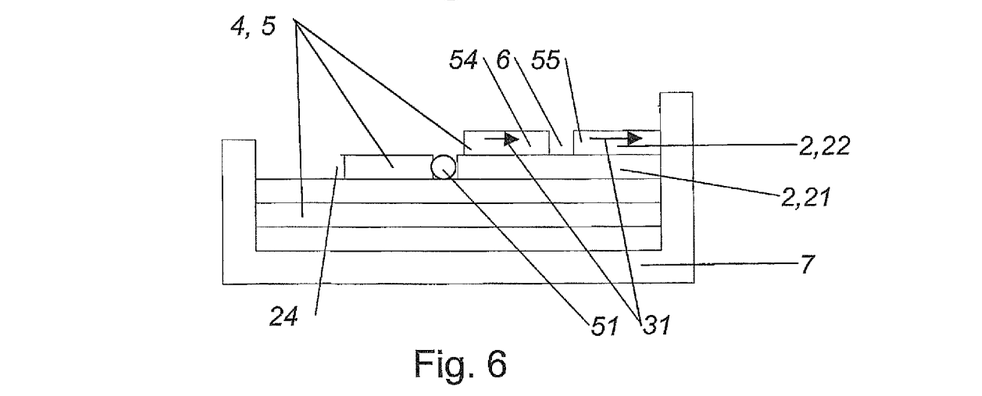
FIG. 6 shows five winding layers of one half of a coil of a first embodiment and identification of the advance direction of the fifth winding layer in a schematic sectional illustration.

The continuation of the winding procedure is shown in FIG. 6. In FIG. 6, in addition to FIG. 5, the support turn 51 of the fourth-innermost winding layer 2 and the fifth-innermost winding layer 2 are shown. The wire is guided from the temporarily open end 24 of the fourth-innermost winding layer 2 using a wire jump 41—shown in FIGS. 9 and 10—into the gap 6 of the fourth winding layer 2. In this wire jump 41, the wire 4 is guided over multiple, advantageously more than two, in particular more than three turns 5 of the previously wound fourth-innermost winding layer 2. The support turn 51 can be spaced apart from the previously wound turn 5 by at least two, preferably by at least three, in particular by at least four wire diameters. Because high lateral forces occur in the wire 4 in a wire jump 41 of this type, the danger of slipping, i.e., lateral sliding parallel to the winding layer 2, of a wire part is particularly high immediately before and after the wire jump 41. In order to be able to implement a wire jump 41 with high precision and with low location tolerances and dimensional tolerances, the wire 4 must be secured against lateral slipping at both ends of the wire jump 41. This securing is performed before the wire jump 41 by the last-wound turn 5 of the fourth-innermost winding layer 2. This securing is performed after the wire jump 41 by the support turn 51, which is wound immediately after the wire jump 41, in the fourth-innermost winding layer 2. This support turn 51 is held on both sides in the direction of the base surface 16 and in the direction of the cover surface 17 by the first turn 54 and the second turn 55, so that the support turn 51 is secured against lateral slipping. The first turn 54 and the second turn 55 lie adjacent, essentially adjoining the support turn 51, and even high lateral forces occurring due to the wire jump 41 in the wire 4 may be absorbed by the support turn 51, without the danger of slipping of the support turn 51 arising. The support turn 51 can be situated at least regionally completely in this winding layer 21.

After the winding of the support turn 51, the wire 4 is guided into the next-higher winding layer 2, i.e., the fifth-innermost winding layer 2, whereby a step 23 is implemented. Several turns 5 and a first turn 54 of the fifth-innermost winding layer 2 are wound with the advance direction 31 in the direction of the base surface 16. An offset 42 of the wire 4 which is enlarged by essentially one wire diameter is again wound in this first turn 54 of the fifth-innermost winding layer 2. The subsequently wound second turn 55 of the fifth-innermost winding layer 2 is wound adjacent to and spaced apart from the first turn 54 through the enlarged offset 42 of the wire 4 of the first turn 54 of the fifth-innermost winding layer 2, whereby a gap 6 is implemented in the fifth-innermost winding layer 2. After the winding of the second turn 55 of the fifth-innermost winding layer 2, the fifth-innermost winding layer 2 is wound to the end in the direction of and up to the base surface 16.

Figure 7:
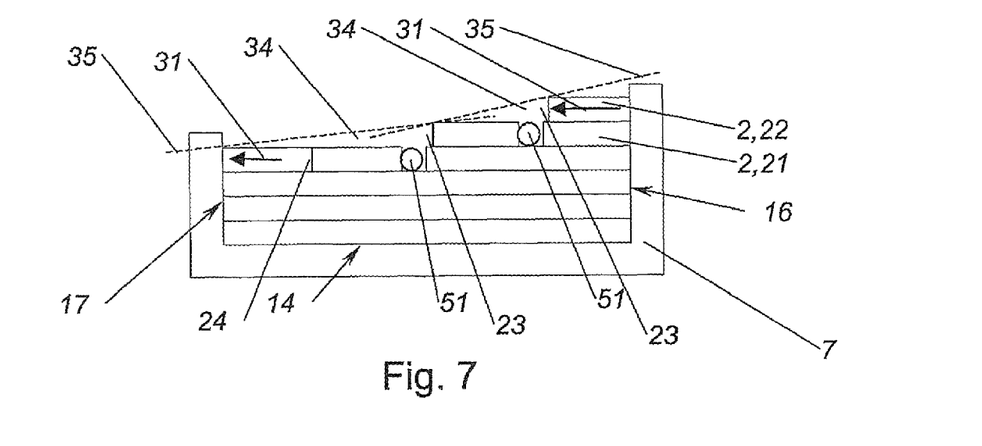
FIG. 7 shows one half of a coil of a first embodiment and identification of the advance direction of the sixth winding layer in a schematic sectional illustration.

The sixth-innermost winding layer 2 is particularly emphasized in FIG. 7. The wire 4 is wound in the advance direction 31, which is implemented in the direction from the base surface 16 to the cover surface 17, up to the gap 6 in the fifth-innermost winding layer 2. Upon reaching this gap 6, the wire 4 is guided into this gap 6, whereby a support turn 51 is implemented. This support turn 51 forms the support for the immediately following wire jump 41 (not shown), which is situated between one end of this support turn 51 and a second turn 5 situated in a different winding layer 2, in this case the fourth-innermost winding layer 2. The wire jump 41 is implemented in a coil 1 according to the invention of this embodiment between the support turn 51 in the fifth-innermost winding layer 2 to the temporarily open end 24 of the fourth-innermost winding layer 2. The wire jump 41 occurs inside a turn 5. In particular, the wire jump 41 can occur in a sub area of a turn 5. The coil 1 can be implemented having an orthocyclic winding.

This wire jump extends over a plurality of turns 5, the support turn 51 being able to be spaced apart from the subsequently wound turn 5 by at least two, preferably at least three, in particular at least four wire diameters. High lateral forces can occur in the wire piece in the wire jump 41 and in the two wire pieces in the area of the two ends of the wire jump 41. These lateral forces are absorbed in the area immediately before the wire jump 41 by the support turn 51 in the fifth winding layer 2 and are absorbed immediately after the wire jump 41 by the last turn 5, which adjoins the temporarily open end 24, of the fourth-innermost winding layer 2. Slipping of the wire 4 in the area of this wire jump 41 and in the area of the ends of this wire jump 41 is prevented easily and with high reliability in this way, the support turn 51 being at least regionally situated completely in this winding layer 21.

After this wire jump 41, the fourth-innermost winding layer 2 is wound to the end in the advance direction 31, which is directed in the fourth-innermost winding layer 2 toward the cover surface 17. The area between temporarily open end 24 of the fourth-innermost winding layer 2 and the cover surface 17 is filled with turns 5 in this way. The fourth-innermost winding layer 2 is implemented completely between the base surface 16 and the cover surface 17 in this way, so that the temporarily open end 24 in this winding layer 2 does not appear in the finished wound coil 1. For completion, the wire 4 is guided through the coil carrier 7 in the area of the cover surface 17 and the coil 1 is completely wound. The finished wound coil 1 according to this embodiment has two visible wire jumps 41 and two visible steps 23.

In circularly-symmetrical electrical components, in particular in electric motors, the circumference of the electrical component increases with increasing spacing from the center and the central axis of the electrical component and, accompanying this, the circumference and the surface area of the electrical component increase with increasing distance from the central axis. In order to use this increase of surface area and volume in the component, the base surface 16 of the coil 1, which has six winding layers 2, for example, can be situated facing away from the central axis and the cover surface 17 of the coil 1, which has four winding layers 2, for example, can be situated facing toward the central axis. Two steps 23 are implemented in the coil outer surface 15 along the coil height 18. The volume available for the coil 1 can be used particularly well in this way and the power of the electrical component can be increased with identical external dimensions.

It can be provided that the wire 4 is guided along the coil circumference of a turn 5 in at least one first area along the coil circumference essentially perpendicular to a coil axis 11, the coil axis 11 being situated parallel to the main magnetic field direction of the current-carrying coil 1, at least one second area along the coil circumference being implemented to implement the offset 42 of the wire 4—the wire advance. In this way, a coil 1 can be wound with orthocyclic winding. In this case, the at least one wire jump 41 can also be implemented in the area of the offset 42 of the wire 4. In this context, multiple first areas and multiple second areas may also be implemented along the coil circumference, a second area being implemented in each case between one first area and another first area. It can be provided that at least two or more support turns 51 are situated in the gap 6. This can be advantageous above all in coils 1 having two or more wound wires 4, in particular wires wound in parallel.

This support turn 51 may also be situated in other winding layers 2 in other embodiments. In generalization thereof, the configuration of the support turn 51 can therefore be situated in a first winding layer 21, this first winding layer 21, as in this embodiment, for example, being able to be the fourth-innermost winding layer 2. Multiple support turns 51 may also be implemented in different winding layers. Multiple first winding layers 21 each associated with one support turn 51 of the winding layer 2 may also be implemented. If multiple support turns 51 are implemented in a winding layer 2, for example, the seventh-innermost winding layer 2, each of these multiple support turns 51 is associated with precisely one first winding layer 21 and each of these first winding layers 21 is identical to the seventh-innermost winding layer.

It can be provided that at least one turn 5 of a second winding layer 22 is wound before or after the winding of the at least one support turn 51, the second winding layer 22 being situated adjacent to the first winding layer 21 and on the side of the first winding layer 21 facing away from the coil inner side 14. It can also be provided that the second winding layer 22 is delimited by the support turn 51. The second winding layer 22 can be identical to the second-innermost, third-innermost, fourth-innermost, fifth-innermost, etc., winding layer 2 of the coil 1, depending on the embodiment. The second winding layer 2 can be delimited by the support turn 51. The length of the first winding layer 21 can also be greater than the length of the second winding layer 22. A temporarily open end 24 or a step 23 can be implemented in the coil 1 in this way.

Furthermore, it can be provided that the turns 5 of the second winding layer 2 are wound after the winding of the support turn 51, and a guide for the first turn 54 wound in the second winding layer 22 is implemented at the insertion point of the wire 4 into the gap 6. The winding of the step 23 or the temporarily open end 24 of the second winding layer 22 can be represented particularly easily in this way.

Furthermore, the two steps 23 are shown in FIG. 7. The step 23 is formed by one turn 5 of an upper step winding layer and by multiple turns 5 of a lower step winding layer. An external tangent 35 can be associated with each of these two steps 23. A step free surface 34 is implemented by the turns 5 comprising one of the steps 23 and the external tangent 35 associated with this step. This step free surface 34 is essentially the wedge-shaped area from the step 23 up to the end of the lower step winding layer, which can be formed either by a further step 23 or the cover surface 17.

Figure 8:
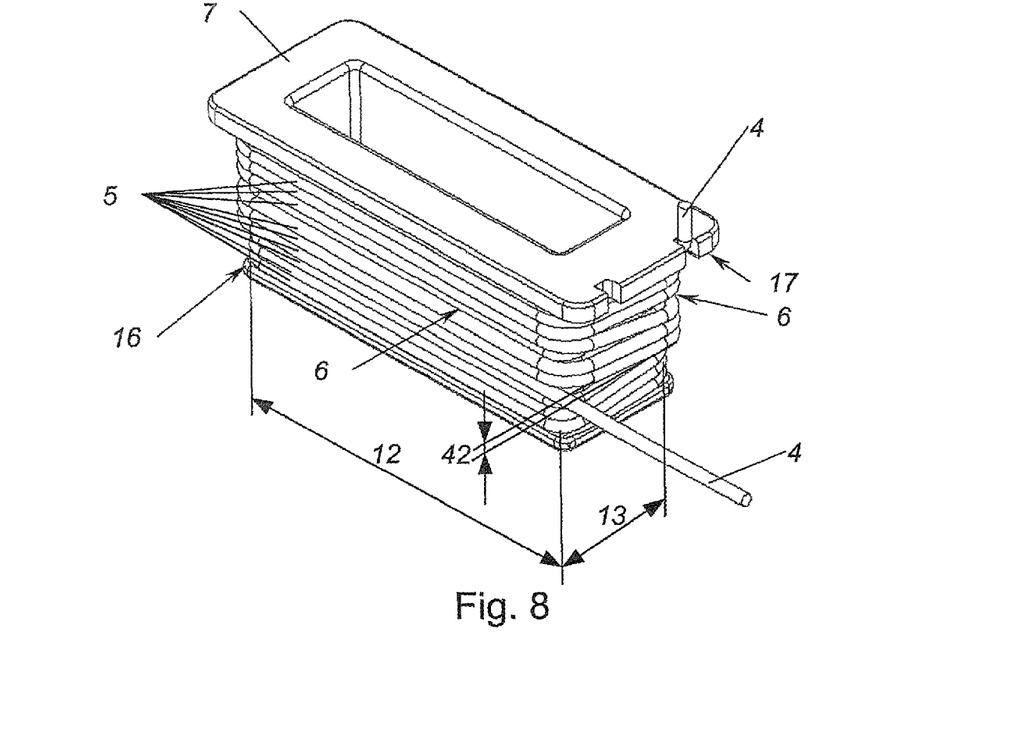
FIG. 8 shows a coil of a second embodiment in axonometric illustration during the winding procedure in a snapshot before the winding of a wire jump.
Figure 9:
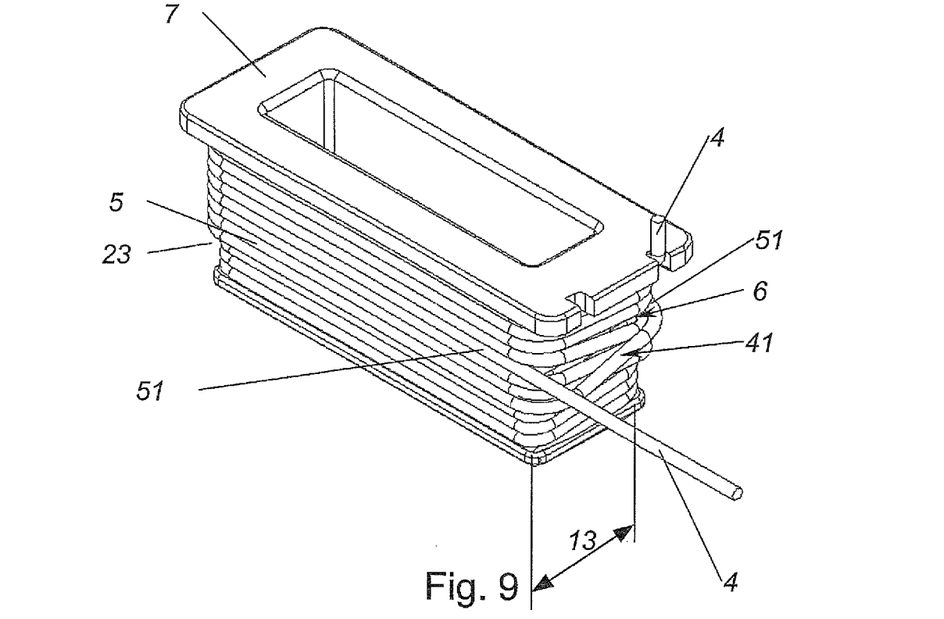
FIG. 9 shows a coil of a second embodiment in axonometric illustration during the winding procedure in a snapshot after the winding of a wire jump and a support turn immediately following the wire jump.
Figure 10:
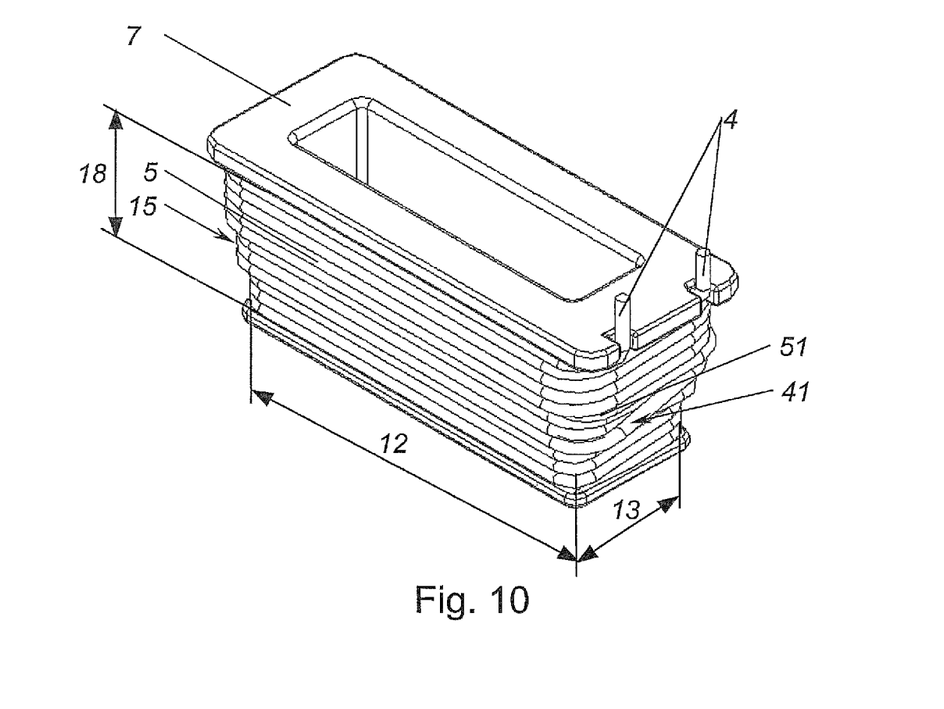
FIG. 10 shows a coil of a second embodiment in axonometric illustration after completed winding procedure.

FIGS. 8 through 10 show a coil 1 having a mechanical layer winding, in particular a mechanical layer precision winding, having at least one wire 4, the coil 1 comprising a coil axis 11, a coil inner side 14, a base surface 16, a cover surface 17, and at least two winding layers 2, one winding layer 2 being formed by turns 5 situated essentially parallel to the coil inner side 14, the coil axis 11 being situated parallel to the main magnetic field direction of the current-carrying coil 1, and the base surface 16 and the cover surface 17 each being essentially perpendicular to the coil axis 11, at least one second winding layer 22 being incompletely wound, and the end of the second winding layer 22 spaced apart from the base surface 16 or the cover surface 17 being delimited by a support turn 51, the support turn 51 being at least regionally situated in the first winding layer 21 adjacent to the second winding layer 22 in the direction of the coil inner side 14.

FIG. 8 shows a coil 1 in a second embodiment in axonometric illustration in a snapshot during the winding. The first end of the wire 4 of the coil, which is connected to the innermost winding layer 2 of the coil and the coil carrier 7, which can comprise plastic, metal, wood, or composite materials, are shown. Furthermore, a coil length 12, a coil width 13, and a coil height 18 are shown. Multiple winding layers 2 are wound along the coil height 18, the number of the winding layers 2 wound one above another along the coil height 18 varying, whereby a coil 1 comprising steps 23 on the coil outer side 15 is implemented, i.e., a conical coil 1. The coil 1 has first areas, in which the wire 4 is guided without advance and is wound without offset 42, and second areas, in which the wire 4 is guided with advance and is wound with offset 42. The first area is implemented along the coil length 12. The second area is implemented along the coil width 13.

The snapshot during the winding shown in FIG. 8 shows one completely wound winding layer 2 and one incompletely wound winding layer 2. The incomplete winding layer 2 is referred to as the first winding layer 21 for easier differentiation—and because it is not obvious in this illustration how many winding layers 2 are wound below this winding layer 2. A gap 6 is implemented in the first winding layer 21. This gap 6 is implemented by the enlarged offset 42 of the wire 4 of a first turn 54 of this first winding layer 21.

The wire jump 41, which is shown in FIG. 9, is wound immediately following this illustrated snapshot. FIG. 9 shows a further snapshot of the winding procedure of the coil, precisely one additionally wound turn 5 being shown in relation to FIG. 8. The wire is guided using a wire jump 41 into the gap 6 in the first winding layer 21 from the open end 24 in the first winding layer 21. After the wire jump 41, the support turn 51 is wound in this gap 6 immediately thereafter. This support turn 51 lies at least regionally completely in the first winding layer 21. Further turns 5 in the first winding layer 21 may at least regionally adjoin opposing sides of the support turn 51.

The further winding procedure is obvious in FIG. 10. At the end of the support turn 51, the wire 4 is guided out of the first winding layer 21 into a second winding layer 22 lying directly above it, whereby a step 23 is implemented in the coil outer side 15. The second winding layer 22 is a winding layer 2 of the coil 1 different from the first winding layer 21. For example, the first winding layer 21 can be the fourth-innermost winding layer 2, so that the second winding layer 22 implements the fifth-innermost winding layer 2. The second winding layer 22 is wound from this step 23 in the direction of the cover surface 17. After winding has been performed up to the cover surface 17, the wire 4 is guided through the coil carrier 7 and the coil 1 is completely wound.

The coil 1 can thus be regionally implemented as planar, the steps 23 and open ends 24 of the coil 1 allowing a conical coil outer surface 15. Furthermore, the coil 1 can be implemented having a convex or a concave coil outer surface 15, so that the contour of the coil 1 can be adapted even better to that of the electrical component and the power density of the electrical component can be increased still further.

Because the wire can be guided essentially parallel to one another in all winding layers 2 along the coil length 12 and in particular in the first area along the coil circumference, crossing of the wire of different winding layers 1, which reduces the degree of filling, is avoided in these areas, the winding being able to be wound orthocyclically. The support turn 51 can be situated completely in the first winding layer 21 in essentially the entire first area. The support of the support turn 51 can occur in both directions parallel to the first winding layer 21. It is possible using the support turn 51 implemented in this way that a wire jump 41 is implemented at both ends of the support turn 51, a wire jump 41 being able to be wound in each case immediately before and immediately after the support turn 51. Even complex contours may thus be mechanically implemented reliably, reproducibly, and with low dimensional tolerances.

Figure 11:
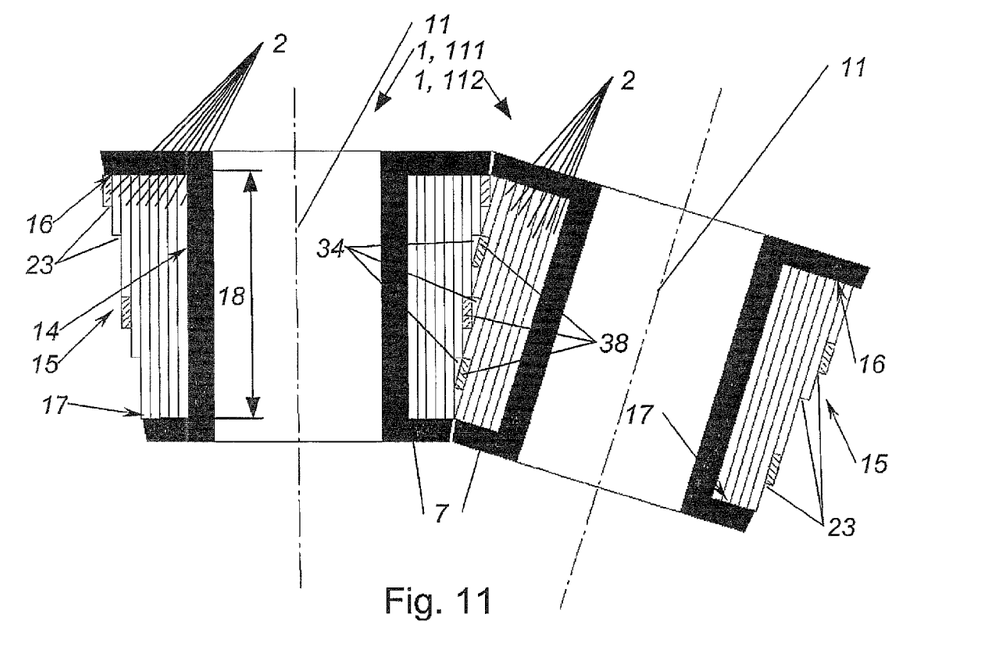
FIG. 11 shows two adjacent coils of a third embodiment and a fourth embodiment in section upon exemplary configuration in an electrical component—not shown—in schematic illustration.

FIG. 11 shows two adjacent different coils 1 of a third and fourth embodiment of a coil configuration in section, the particularly annular coil configuration of an electrical component (not shown) comprising a plurality of coils 1. Two different embodiments of the coil 1 are shown, which are situated alternately adjacent to one another. The left of the two coils 1 shown in the figure is identified as the first coil 111—for better differentiation and without classification or evaluation—and the right of the two coils 1 is identified as the second coil 112. For this circular, oval, rectangular, or particularly annular coil configuration comprising a plurality of coils 1 of at least two different embodiments of coils 1, reference can therefore also be made to the simultaneous use of a coil type "A", for example, the first coil 111, and a coil type "B", for example, the second coil 112. In order to represent more complex geometries and/or geometries deviating from the circular shape, three or more embodiments of the coils 1, 111, 112 may also be used working together. This coil configuration can be in an electrical component, in particular an electric motor, having a coil configuration, in particular an annular coil configuration, the electrical component comprising at least one coil 1 according to the invention. The two coils 1, 111, 112 different from one another are situated adjacent to one another, the two coil axes 11 of the two different coils 1, 111, 112 not being coincident.

The individual turns 5 of the coils 1, 111, 112 are not shown in this schematic illustration, but the individual winding layers 2 are shown. Furthermore, the coil carrier 7, the coil inner side 14, the coil outer side 15, the base surface 16, the cover surface 17, and the coil height 18 are shown. The first coil 111 has at most nine winding layers 2. The second coil 111 has at most eight winding layers 2. The maximum number of the winding layers 2 is situated in both coils 1, 111, 112 in the area of the base surface 16. In this way, an electrical component can be implemented, the coil outer side 15 of at least one of the coils 1 having at least one step 23, the at least one step 23 being formed by external turns 5 of a lower step winding layer and one external turn 5 of an upper step winding layer. In the event of multiple steps 1 along the coil height 18, multiple upper step winding layers and multiple lower step winding layers may be implemented.

The areas of external turns 5 of an adjacent coil 1 engaging in the step free surfaces 34 are implemented in some winding layers 2 and are shown shaded in FIG. 11. These shaded areas are referred to hereafter as the overlap areas 38. These overlap areas 38 are thus the turns 5 of a coil 1, 111, 112 which may engage in the step free surfaces 34 of the coil 1, 111, 112 adjacent to this one coil 1, 111, 112.

The different implementation of the coil outer side 15 between first coil 111 and second coil 112 is recognizable particularly in the middle in the figure, in which the two coils 1, 111, 112 shown border adjacent to one another. Beginning at the base surface 16 of the first coil 111, several turns 5 of the ninth winding layer 2 are implemented, which represents the outermost winding layer 2 in this area of the first coil 111. A step 23, the step 23 closest to the base surface 16, which is referred to hereafter as the first step 23 of the first coil 111, delimits the ninth winding layer 2 of the first coil 111, which is open toward the cover surface 17. A second step 23 of the first coil 111 is implemented further along the coil outer side 15 in the direction toward the cover surface 17. Eight winding layers 2 are implemented one above another between the first and second steps 23 in the first coil 111 and the eighth winding layer 2 forms the outermost winding layer 2 of the first coil 111 in this area of the coil height 18. The third step 23 is implemented on the end of the eighth winding layer 2 open toward the cover surface 17. Seven winding layers 2 are implemented one above another in the first coil 111 between the third step 23 and the second step 23, and the seventh winding layer 2 forms the outermost winding layer 2 in this area of the coil height 18. The fourth step 23 of the first coil 111 is implemented on the end of the seventh winding layer 2 of the first coil 111 open toward the cover surface 17. Six winding layers 2 are implemented one above another between the third and fourth steps 23 in the first coil 111 and the sixth winding layer 2 forms the outermost winding layer 2 in this area of the coil height 18. Five winding layers 2 are implemented one above another from the fourth step 23 of the first coil 1 and the fifth winding layer 2 forms the coil outer side 15 of the first coil 111 between the fourth step 23 and the cover step 17.

The configuration is similar in the second coil 112, which shows a coil 1 designed differently from the first coil 111 according to FIG. 11: eight winding layers 2 are implemented one above another in the area of the cover surface 16 and the eighth winding layer 2 forms the coil outer side 15 of the second coil 112 in this area. Seven winding layers 2 are implemented one above another from the step 23 of the second coil 112 closest to the base surface 16, i.e., the first step 23 of the second coil 112, and the coil outer side 15 is implemented in this area of the second coil 112 by the seventh winding layer 2. The second step 23 of the second coil 112 is implemented on the end of the seventh winding layer 2 of the second coil 112 open toward the cover surface 17 of the second coil 112. The third step 23 of the second coil 112 is implemented on the end of the sixth winding layer 2 of the second coil 112 open toward the cover surface 17 of the second coil 112. Six winding layers 2 are implemented one above another between the second and third steps 23 of the second coil 112 and the coil outer side 15 is implemented in this area by the sixth winding layer 2. Five winding layers 2 are wound one above another from the third step 23 of the second coil 112 and the coil outer side 15 is implemented between the third step 23 and the cover surface 17 by the fifth winding layer 2.

The first coil 111 and the second coil 112 thus differ in the number of the maximum winding layers 2 and in the number of the steps 23 implemented along the coil height. The positions along the coil height of the steps 23 of the two coils 1, 111, 112 are also implemented differently. The first step 23 of the first coil 111 has the smallest spacing to the base surface 16. The second step 23 of the first coil 111 has the second-smallest spacing to the base surface 16. The first step 23 of the second coil 112 has the third-smallest spacing to the base surface 16. The second step 23 of the second coil 112 has the fourth-smallest spacing to the base surface 16. The third step 23 of the first coil 111 has the fifth-smallest spacing to the base surface 16. The fourth step 23 of the first coil 111 has the sixth-smallest spacing to the base surface 16. The third step 23 of the second coil 112 has the seventh-smallest and thus greatest spacing to the base surface 16.

The first step 23 of the second coil 112 engages in the step free surface 34 of the second step 23 of the first coil 111 in this advantageous configuration of the adjacent coils 1, 111, 112. The third step 23 of the first coil 111 engages in the step free surface 34 of the second step 23 of the second coil 112. And the third step 23 of the second coil 112 engages in the step free surface 34 of the fourth step 23 of the first coil 111. The step free surfaces 34 may be used better in this way and may be partially filled with wire 4, whereby a higher degree of filling of the coil configuration is made possible and the power density of the coil configuration and the electrical component (not shown) comprising the coil configuration can be increased. The first coil 111 and the second coil 112 may also be wound orthocyclically in particular.

In this way, an electrical component can be provided, a coil outer face 15 of at least one of the coils 1 having at least one step 23, the at least one step 23 being formed by external turns 5 of a lower winding layer and one external turn 5 of an upper winding layer, a step free surface 34 is formed by the turns 5 of the step 23 and outer tangent 35 on the turns 5 of the step 23—viewed in a sectional plane containing the coil axis, and a further of the coils 1 engages in the at least one step free surface 34.

In contrast thereto—in an embodiment which is not shown—the steps 23 are implemented mirror-symmetric in the coil outer side 15 facing toward one another of two adjacent coils 1 of identical embodiment. Therefore, with adjacent configuration of these two coils 1, one step 34 of one coil 1 and one step 34 of the other coil 1 may touch. The step free space 34 cannot be filled with wire, however, so that the maximum spacing of the coils 1 upon contact of the coils 1 in the area of the steps 34 corresponds to approximately twice the wire diameter.

This maximum spacing of the coils 1 can be essentially halved upon configuration of two touching adjacent coils 1 of different stepped embodiments. In this way, it can be made possible in an electrical component that a coil outer surface 15 of at least one of the coils 1 has at least one step 23, the at least one step 23 being formed by external turns 5 of a lower winding layer and one external turn 5 of an upper winding layer, a step free surface 34 is formed by the turns 5 of the step 23 and the outer tangent 35 on the turns 5 of the step 23—viewed in a sectional plane containing the coil axis 11, and a further of the coils 1 engages in the at least one step free surface 34.

Due to the small tolerances, adjacent coils 1, 111, 112 may be situated with little spacing to one another in the electrical component and the power density of the electrical component, in particular the electric motor, is increased. In particular, servomotors and electric motors may be implemented having performance which remains the same and/or smaller dimensions and lower weight.

Further embodiments according to the invention have only a part of the described features, any combination of features, in particular also from different described embodiments, being able to be provided.

What is claimed is:

1. A coil, comprising:
   a coil former defining a coil axis and having an inner side, a base surface, and a cover surface spaced from the base surface, wherein the base surface and the cover surface extend substantially perpendicular to the coil axis; and
   a first winding layer formed by wire turns wound on the coil former and extending essentially parallel to the coil inner side, and a second winding layer disposed on the first winding layer and being-shorter along the coil axis than the first winding layer, the second winding layer having a first end proximate to one of the base surface or the cover surface and a second end distal from the base surface or the cover surface, said second winding layer being subdivided along its length into two winding segments separated by a gap, wherein the gap is sized to receive a wire from the first winding layer at a wire jump, with the wire retained in the gap and forming a support turn,
   wherein the coil is a current-carrying coil having a main magnetic field direction extending parallel to the coil axis.

2. The coil of claim 1, wherein the first and second winding layers are machine-wound precision winding layers.

3. The coil of claim 1, wherein at least portions of an additional winding layer disposed on the second winding layer adjoin one of opposing sides of the support turn in the second winding layer.

4. An electrical component, wherein the electrical component comprises at least one coil having
   a mechanical layer winding;
   at least one wire;
   a coil inner side;
   a base surface; and
   a cover surface; and
   at least first and second winding layers, with the first winding layer being formed by turns situated essentially parallel to the coil inner side, and with the second winding layer being incompletely wound and having an end which is spaced apart from the base surface and/or the cover surface, and delimited by a support turn, said support turn being at least regionally situated in the first winding layer adjacent to the second winding layer in a direction of the coil inner side,
   wherein the coil is a current-carrying coil which defines a coil axis extending in parallel relationship to a main magnetic field direction of the coil, and
   wherein the base surface and the cover surface extend in substantial perpendicular relationship to the coil axis,
   wherein at least two adjacent coils each have a stepped coil outer surface, with the steps of the coil outer surfaces of said coils, which face toward one another, being arranged so that a spacing of the coil outer surfaces is essentially less than or equal to 1.3 times the wire diameter.

5. The electrical component of claim 4, wherein a coil outer surface of the at least one coil has at least one step which is formed by external turns of a radially inner winding layer and one external turn of a radially outer winding layer, wherein a step free surface is formed by the turns of the at least one step and an outer tangent on the turns of the at least one step—as viewed in a sectional plane containing the coil axis, and a further one of the coils engages in the at least one step free surface.

6. The electrical component of claim 4, wherein the spacing is essentially less than or equal to 1.2 times the wire diameter.

7. The electrical component of claim 4, wherein the spacing is essentially less than or equal to 1.1 times the wire diameter.

8. The electrical component of claim 4, wherein the electrical component is an electric motor having a coil configuration.

9. The electrical component of claim 8, wherein the coil configuration is an annular coil configuration.

* * * * *